US011820084B2

(12) United States Patent
Lakhani et al.

(10) Patent No.: US 11,820,084 B2
(45) Date of Patent: Nov. 21, 2023

(54) SEALING SYSTEM FOR SEALING A TUBE AND AN AUTOMATED METHOD OF OPERATING THE SAME

(71) Applicant: Cytiva Sweden AB, Uppsala (SE)

(72) Inventors: Hanish Lakhani, Karnataka (IN);
Preetam Hosamani, Karnataka (IN);
Nishu Garg, Karnataka (IN);
Bhaskaran Savarimuthu, Karnataka (IN); Srihari Kannuri, Karnataka (IN);
Juzar Mazhar Ezzy, Karnataka (IN);
Ramu Balaguru, Karnataka (IN)

(73) Assignee: Cytiva Sweden AB, Uppsala (SE)

( * ) Notice: Subject to any disclaimer, the term of this patent is extended or adjusted under 35 U.S.C. 154(b) by 0 days.

(21) Appl. No.: 17/413,702

(22) PCT Filed: Dec. 18, 2019

(86) PCT No.: PCT/EP2019/086076
§ 371 (c)(1),
(2) Date: Jun. 14, 2021

(87) PCT Pub. No.: WO2020/127570
PCT Pub. Date: Jun. 25, 2020

(65) Prior Publication Data
US 2022/0016853 A1 Jan. 20, 2022

(30) Foreign Application Priority Data
Dec. 21, 2018 (IN) .............................. 201841048613

(51) Int. Cl.
*B29C 65/00* (2006.01)
*B29C 65/04* (2006.01)
(Continued)

(52) U.S. Cl.
CPC ............ *B29C 66/965* (2013.01); *B29C 65/04* (2013.01); *B29C 65/1425* (2013.01);
(Continued)

(58) Field of Classification Search
CPC ... B29C 66/965; B29C 65/04; B29C 65/8523; B29C 66/8322; B29C 66/857;
(Continued)

(56) References Cited

U.S. PATENT DOCUMENTS 9,550,588 B2 1/2017 Mueller et al.
2007/0084285 A1 4/2007 De Baerdemaeker et al.
(Continued)

FOREIGN PATENT DOCUMENTS

EP 1798614 A2 6/2007
EP 3128323 2/2017
(Continued)

OTHER PUBLICATIONS

PCT International Search Report and Written Opinion for PCT/EP2019/086076 dated Mar. 10, 2020 (9 pages).
(Continued)

*Primary Examiner* — George R Koch
(74) *Attorney, Agent, or Firm* — Eversheds Sutherland (US) LLP

(57) ABSTRACT

Disclosed is an automated method (54) which includes directing rays from a source (34) to a tube (38) disposed between relatively movable first and second sealing plates (20, 32), capturing an image (70) of at least a portion of the tube (38) by an image capturing device (26), and transferring the captured image (70) to a processing device (24). The method (54) also includes determining a plurality of tube parameters by the processing device (24) based on the captured image (70), using an image processing technique and determining a plurality of sealing parameters from a
(Continued)

database (44) by the processing device (24) based on the determined plurality of tube parameters. Additionally, the method (54) includes controlling the drive unit (22) and a heater (36) by the processing device (24) influenced by the determined plurality of sealing parameters, to respectively compress the tube (36) and perform heat sealing of the tube (38).

22 Claims, 12 Drawing Sheets

(51) Int. Cl.
*B29C 65/14* (2006.01)
*B29C 65/16* (2006.01)
*B29C 65/82* (2006.01)

(52) U.S. Cl.
CPC .......... *B29C 65/16* (2013.01); *B29C 65/8253* (2013.01); *B29C 66/4312* (2013.01); *B29C 66/73921* (2013.01); *B29C 66/8322* (2013.01); *B29C 66/857* (2013.01); *B29C 66/861* (2013.01); *B29C 66/91231* (2013.01); *B29C 66/9221* (2013.01); *B29C 66/9231* (2013.01); *B29C 66/932* (2013.01); *B29C 66/963* (2013.01); *B29C 66/9672* (2013.01); *B29C 66/9674* (2013.01); *B29C 66/974* (2013.01)

(58) Field of Classification Search
CPC .......... B29C 66/91231; B29C 66/9221; B29C 66/9231; B29C 66/932; B29C 66/963; B29C 66/9672; B29C 66/9674; B29C 66/974

See application file for complete search history.

(56) References Cited

U.S. PATENT DOCUMENTS

| | | | |
|---|---|---|---|
| 2007/0142960 A1* | 6/2007 | Bollinger | ............ B29C 66/1142 700/212 |
| 2008/0022632 A1 | 1/2008 | Gysi et al. | |
| 2011/0108181 A1* | 5/2011 | Cai | ........ B29C 66/965 228/104 |
| 2016/0258880 A1* | 9/2016 | Smorgon | ............. H04N 5/2256 |
| 2018/0104721 A1 | 4/2018 | Dannan | |

FOREIGN PATENT DOCUMENTS

| | | |
|---|---|---|
| GB | 1487482 | 9/1977 |
| JP | 2000202034 A | 7/2000 |
| JP | 2003307505 | 10/2003 |
| JP | 2008189363 | 8/2008 |
| JP | 2017226116 | 12/2017 |
| WO | 2004/099751 A2 | 11/2004 |
| WO | 2012106447 | 8/2012 |
| WO | 2016038395 | 3/2016 |

OTHER PUBLICATIONS

Office Action and Search Report Issued in Chinese Patent Application No. 201980084311.1, dated Nov. 10, 2022, with English Summary (27 Pages).

\* cited by examiner

SEALING SYSTEM FOR SEALING A TUBE AND AN AUTOMATED METHOD OF OPERATING THE SAME

CROSS REFERENCE TO RELATED APPLICATIONS

This application claims the priority benefit of PCT/EP2019/086076, filed on Dec. 18, 2019, which claims the benefit of Indian Application No. 201841048613 filed on Dec. 21, 2018, the entire contents of which are incorporated by reference herein.

FIELD OF INVENTION

The embodiments of the present specification relate generally to sealing systems, more particularly, to a sealing system for sealing a tube and an automated method of operating the same.

BACKGROUND OF INVENTION

A heat sealer is a machine used to seal products, packaging, and other materials using heat. Heat sealing is a process of sealing materials using heat and pressure. A direct contact method of heat sealing utilizes a constantly heated die or sealing bar/plate(s) to apply heat to a specific contact area or path to seal or weld materials together. The heat sealer may be used to seal uniform monolayers or with materials having several layers. The heat sealing may be used to join two similar materials together or join dissimilar materials, one of which can be a thermoplastic layer, for example.

Sealing machines are used widely in the chemical, medical, and pharmaceutical industries. Sealing machines are used to seal tubes/containers with liquids, granules, powders, or the like. In medical applications, for example, bioprocessing applications and aseptic applications, the sealer machine is useful for sealing feed, harvest, and sample tubing connected to bags or other containers, for purpose of storage and transportation. Conventional sealing machines require a lot of manual interventions which may lead to errors and more sealing time for sealing multiple variants of sealing tubes having different sizes and materials. An amount of force generated by a drive unit and a temperature of a heater of a sealing machine are different for multiple variants of sealing tubes. In conventional sealing machines, such operating parameters are manually input to perform the operation of sealing of tubes. However, it is difficult to manually input the operating parameters for each variant of sealing tubes. Moreover, such manual input of operating parameters can be error prone and can result in production batch losses. The conventional sealing machines are also not suitable for checking a quality of a seal of a tube. Typically, the quality of the seal of the tube is checked by visual inspection. Further, it is difficult to predict a failure of the sealing machine based on the quality of the seal of the tube.

There is a need for an enhanced sealing system capable of automatically handling different variants of sealing tubes and inspection of quality of seals of the sealing tubes. There is also a need to predict a failure of a sealing system based on a determined seal quality.

BRIEF DESCRIPTION OF INVENTION

In accordance with one aspect of the present specification, an automated method for sealing a tube by a sealing system is disclosed. The automated method includes directing rays from a source to a tube disposed between relatively movable first and second sealing plates. At least one of the first and second sealing plates is coupled to a drive unit for causing said relative movement. The method further includes capturing an image of at least a portion of the tube by an image capturing device and transferring the captured image of the at least portion of the tube from the image capturing device to a processing device. The method also includes determining a plurality of tube parameters by the processing device based on the captured image of the at least portion of the tube, using an image processing technique. The method further includes determining a plurality of sealing parameters from a database by the processing device based on the determined plurality of tube parameters. Additionally, the method includes controlling the drive unit and a heater by the processing device influenced at least in part by the determined plurality of sealing parameters, to respectively compress the tube and perform heat sealing of the tube.

In accordance with another aspect of the present specification, a sealing system for sealing a tube is disclosed. The sealing system includes a first sealing plate, a drive unit, and a second sealing plate disposed spaced apart from the first sealing plate. At least one of the first and second plates is coupled to the drive unit for causing relative movement of the first and second sealing plates. The sealing system further includes a heater capable of heat sealing the tube disposable in a space between the first and second plates, a source for directing illuminating rays towards the space, and an image capturing device for capturing an image of the at least portion of the tube in the space. The sealing system also includes a processing device coupled to the image capturing device, the heater, and the drive unit. The processing device is configured to receive the captured image of the at least portion of the tube from the image capturing device and determine a plurality of tube parameters based on the captured image of the at least portion of the tube, using at least one of an image processing technique. Further, the processing device is configured to determine a plurality of sealing parameters from a database based on the determined plurality of tube parameters and control the drive unit and the heater by the processing device influenced at least in part by the determined plurality of sealing parameters, to respectively compress the tube and perform heat sealing of the tube.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein:

FIG. 5b is a schematic representation of a segmented image in accordance with the embodiment of FIG. 5a;

FIG. 7b is a schematic representation of a segmented image in accordance with the embodiment of FIG. 7a;

DETAILED DESCRIPTION

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The use of "including", "comprising", or "having" and variations thereof herein are meant to encompass the items listed thereafter and equivalents thereof as well as additional items.

In accordance with an embodiment of the specification, an automated method for sealing a tube using a sealing system is disclosed. The automated method includes directing rays from a source to a tube disposed between relatively movable first and second sealing plates. In one embodiment, the source may be a light source. In another embodiment, the source may be an infra-red-ray source. In other embodiments, other types of sources used to emit rays of suitable wavelengths are envisioned. At least one of the first and second sealing plates is coupled to a drive unit. The automated method includes capturing an image of the at least portion of the tube by an image capturing device and transferring the captured image of the at least portion of the tube from the image capturing device to a processing device. The type of image capturing device is chosen depending on the type of source used to emit rays.

The method further includes determining a plurality of tube parameters by the processing device based on the captured image of the at least portion of the tube, using an image processing technique. The method also includes determining a plurality of sealing parameters from a database by the processing device based on the determined plurality of tube parameters.

The method further includes controlling a heater and the drive unit by the processing device to perform the sealing of the tube based on the determined plurality of sealing parameters. In accordance with another aspect of the present invention, a sealing system is disclosed. In accordance with the embodiments of the present specification, the automated method and system enables the need to manually input the operating parameters for each variant of sealing tubes. Hence, generation of errors and production batch losses are minimized.

Figure 1:
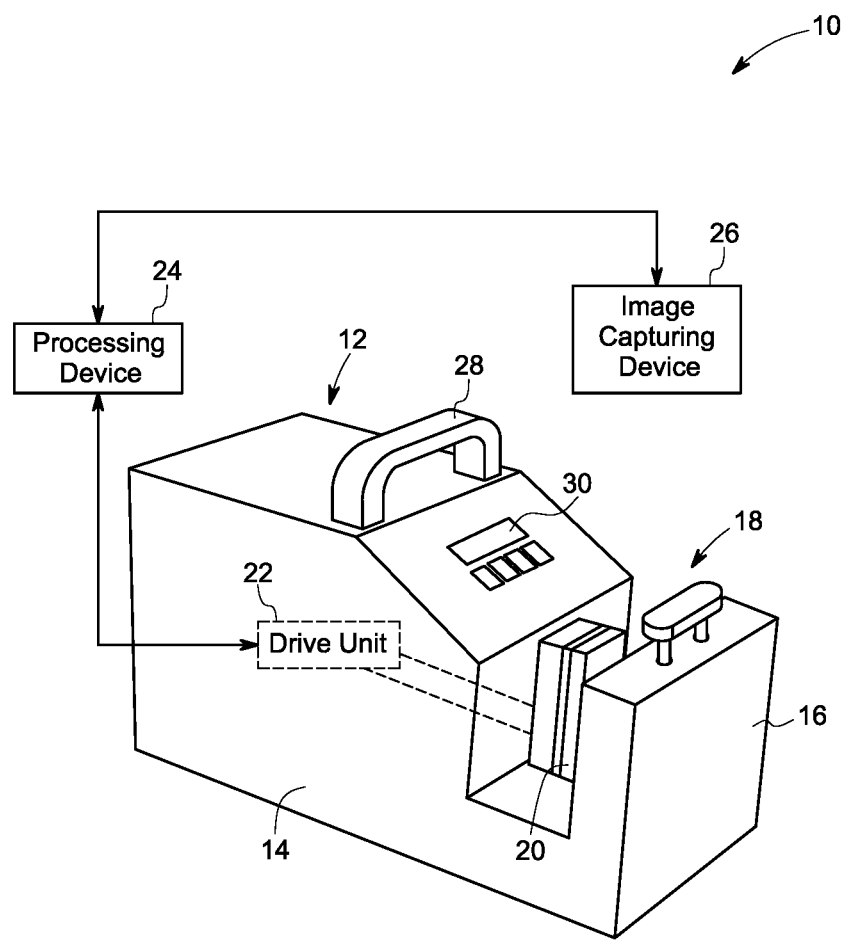
FIG. 1 is a perspective view of a sealing system in accordance with an embodiment of the present specification.

FIG. 1 is a perspective view of a sealing system 10 in accordance with an embodiment of the present specification. The sealing system 10 is a portable automated system used to seal a tube, for example, a thermoplastic tube by applying heat. In another embodiment, the tube may be a glass tube. The tube may be a transparent tube, or a semitransparent tube, or an opaque tube.

The sealing system 10 is useful for sealing a feed, or harvest, or sample tube connected to bags or other containers for purposes of storage and transportation. Such a tube may be used for bioprocessing and aseptic applications, for example.

The sealing system 10 includes a casing 12 having a main portion 14, an end portion 16, and a gap 18 formed between the main portion 14 and the end portion 16. The casing 12 may be made of stainless steel or any other material compatible for life sciences application, for example.

The sealing system 10 further includes a first sealing plate 20 and a second sealing plate (not shown in FIG. 1) disposed in the gap 18 of the casing 12. In the illustrated embodiment, the first sealing plate 20 is coupled to a drive unit 22 disposed within the main portion 14 of the casing 12. The second sealing plate is coupled to the end portion 16. The drive unit 22 is used to move the first sealing plate 20 towards or away from the second sealing plate. The sealing system 10 further includes a back lit light source and a heater (not shown in FIG. 1) disposed in the casing 12. The sealing system 10 also includes an image capturing device 26 and a processing device 24 coupled to the image capturing device 26, the heater, and the drive unit 22. The sealing system 10 also has a carrying handle 28 and can be plugged to a suitable power outlet.

The sealing system 10 further includes an operating control panel 30 on the main portion 14 of the casing 12. The operating control panel 30 may be operated by an operator. It should be noted herein that the sealing system 10 may include additional components and that one or more components described herein may be removed and/or modified without departing from a scope of the sealing system 10.

In another embodiment, the second sealing plate is coupled to the drive unit 22 and the first sealing plate 20 is stationary. In such an embodiment, the drive unit 22 is used to move the second sealing plate towards or away from the first sealing plate 20. In yet another embodiment, both the first sealing plate 20 and the second sealing plate are coupled to the drive unit 22 to cause movement of the first sealing plate 20 and the second sealing plate. It should be noted herein that the drive unit 22 may be an electric motor, or a hydraulic drive unit, or a pneumatic drive unit, or the like.

Figure 2:
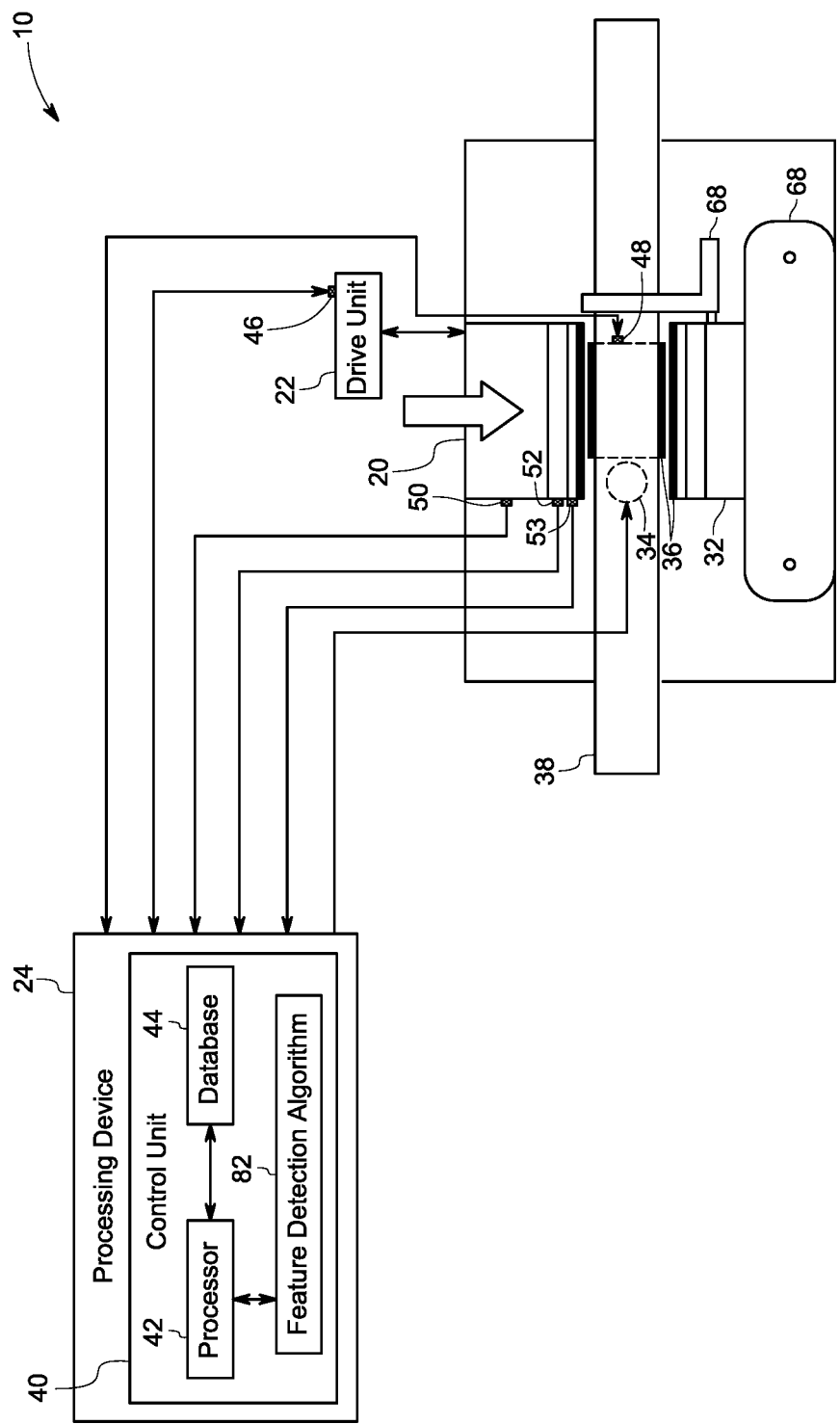
FIG. 2 is a schematic top view of the sealing system in accordance with an embodiment of FIG. 1.

FIG. 2 is a schematic top view of the sealing system 10 in accordance with an embodiment of FIG. 1. As mentioned earlier, the sealing system 10 includes the first sealing plate 20 and a second sealing plate 32 disposed in the gap 18 of the casing 12. The drive unit 22 is used to move the first sealing plate 20 towards or away from the second sealing plate 32. The sealing system 10 further includes a back lit light source 34 and a heater 36 disposed in the casing 12. The back lit light source 34 is used to direct light to a tube 38 disposed in a space between the first sealing plate 20 and the second sealing plate 32, for illuminating the tube 38. Any type of light source suitable for illuminating the tube 38 is envisioned. As noted earlier, in other embodiments, other types of sources used to emit rays of suitable wavelengths are also envisioned. The type of source may be chosen depending on the type of tube such as a transparent tube, or a semi-transparent tube, or an opaque tube. The heater 36 is used apply heat to the tube 38 for the purpose of sealing the tube 38. In one embodiment, the heater 36 is used to apply heat to the tube 38, using laser beams.

In another embodiment, the heater 36 is used to apply heat to the tube 38, using microwaves. In other embodiments, other types of suitable heaters are envisioned. The image capturing device 26 such as a camera is used to capture an image of at least a portion of the tube 38. Additionally, one or more lenses and a long pass filter (not shown) may be used along with the image capturing device 26 for acquiring the image of the at least portion of the tube 38. The long pass filter prevents light rays in visible region from reaching the image capturing device 26.

The sealing system 10 also includes the processing device 24 coupled to the image capturing device 26, the heater 36, and the drive unit 22. Further, in the illustrated embodiment, the processing device 24 includes a control unit 40 having a processor 42 and a database 44 coupled to the processor 42. In some embodiments, the control unit 40 is used to control at least one function of the sealing system 10. In certain embodiments, the control unit 40 may include more than one processor co-operatively working with each other for performing intended functionalities. The control unit 40 is further configured to store and retrieve contents into and from the database 44. In one embodiment, the control unit 40 is configured to initiate and control the functionality of the sealing system 10.

In one embodiment, the control unit 40 includes at least one of a general-purpose computer, a graphics processing unit (GPU), a digital signal processor, and a controller. In other embodiments, the control unit 40 includes a customized processor element such as, but not limited to, an application-specific integrated circuit (ASIC) and a field-programmable gate array (FPGA). In some embodiments, the control unit 40 may be communicatively coupled with at least one of a keyboard, a mouse, and any other input device and configured to receive commands and/or parameters from an operator via a console.

In one embodiment, the database 44 is a random-access memory (RANI), a read only memory (ROM), a flash memory, or any other type of computer readable memory accessible by the processor 42. Also, in certain embodiments, the database 44 may be a non-transitory computer readable medium encoded with a program having a plurality of instructions to instruct the processor 42 to perform a sequence of steps to operate sealing system 10.

Further, the sealing system 10 includes a torque sensor 46 coupled to the drive unit 22 and the processing device 24. The torque sensor 46 is used to detect a torque of the drive unit 22 and transmit an output representative of the detected torque to the processing device 24. The sealing system 10 further includes a temperature sensor 48 coupled to the heater 36 and the processing device 24. The temperature sensor 48 is used to detect a heating temperature of the heater 36. Also, the sealing system 10 includes a distance sensor 50 coupled to the first sealing plate 20 and the processing device 24. The distance sensor 50 is used to measure a movement distance of the first sealing plate 20 from a start location to the tube sealing location proximate to the second sealing plate 32. Additionally, the sealing system 10 includes a timer 52 coupled to the first sealing plate 20 and the processing device 24. The timer 52 is used to measure a time period for moving the first sealing plate 20 from the start location to the tube sealing location proximate to the second sealing plate 32. In another embodiment, an optional speed sensor 53 is coupled to the first sealing plate 20 and the processing device 24. The speed sensor 53 may be used for moving the first sealing plate 20 from the start location to the tube sealing location proximate to the second sealing plate 32.

In accordance with certain embodiments, the processing device 24 is used to receive the captured image of the at least portion of the tube 38 from the image capturing device 26 and determine a plurality of tube parameters based on the captured image of the at least portion of the tube 38, using an image processing technique. The plurality of tube parameters includes one or more of an outer diameter of the tube 38, an inner diameter of the tube 38, and a material of the tube 38. It should be noted herein that the material of the tube 38 is determined based on capacitance of the first and second sealing plates 20, 32. Further, the processing device 24 is used to determine a plurality of sealing parameters from the database 44 based on the determined plurality of tube parameters. The plurality of sealing parameters includes a torque of the drive unit 22, a heating temperature of the heater 36, a movement distance of the first sealing plate 20 from a start location to a tube sealing location proximate to the second sealing plate 32, and at least one of a time period and speed for moving the first sealing plate 20 from the start location to the tube sealing location proximate to the second sealing plate 32. Furthermore, the processing device 24 is used to control the drive unit 22 and the heater 36 to perform the sealing of the tube 38 based on the determined plurality of sealing parameters.

The image capturing device 26 is also used to capture an image of a seal of the tube 38. The processing device 24 is further used to receive the image of the seal of the tube 38 from the image capturing device 26 and process the captured image of the seal of the tube 38 to classify the seal of the tube 38, using artificial neural networks.

Figure 3:
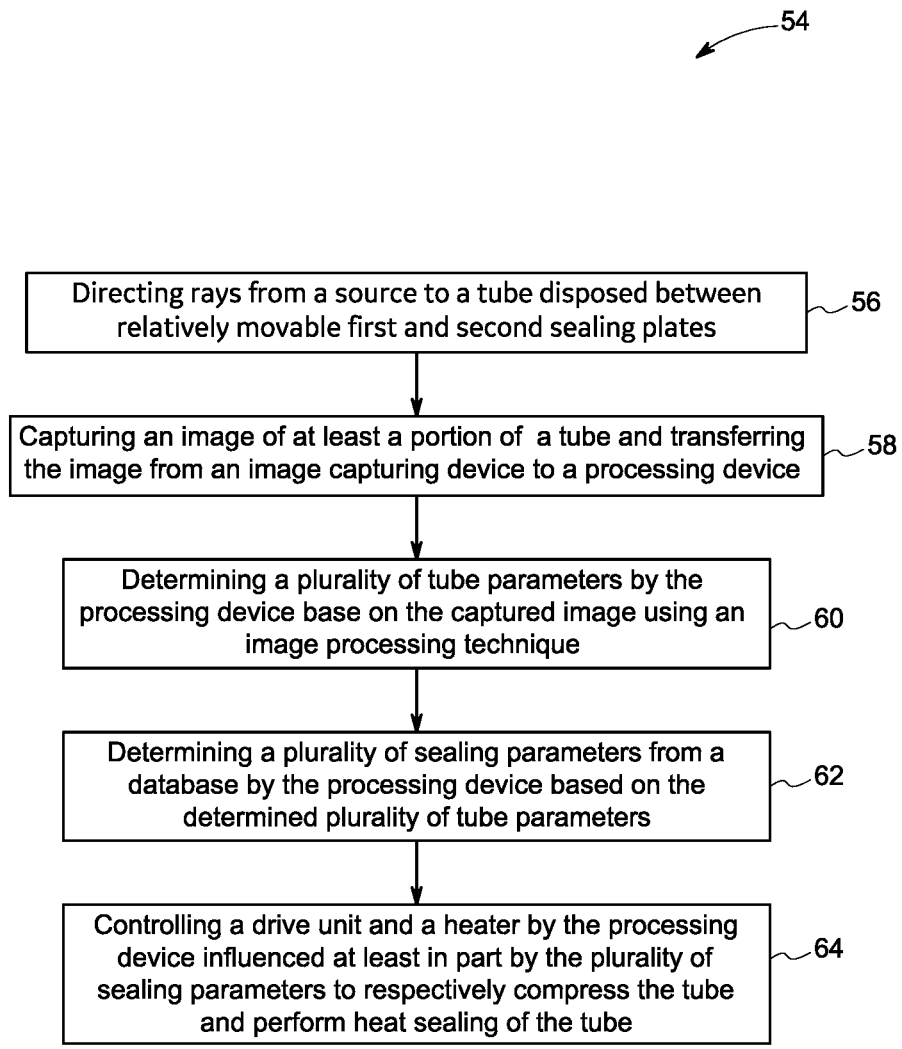
FIG. 3 is a flow chart illustrating a method for sealing a tube using the sealing system in accordance with the embodiments of FIGS. 1 and 2.

FIG. 3 is a flow chart illustrating a method 54 for sealing the tube 38 using the sealing system 10 in accordance with the embodiments of FIGS. 1 and 2. The method 54 includes directing rays from a source such as the back lit light source 34 to the tube 38 disposed between the first sealing plate 20 and the second sealing plate 32, thereby resulting in illumination of the tube 38 as represented by a step 56. The light source 34 may be a laser source, a halogen lamp, or the like. The method 54 further includes capturing an image of at least a portion of the tube 38 by the image capturing device 26 and then transferring the captured image of the at least portion of the tube 38 to the processing device 24 as represented by the step 58.

Further, the method 54 includes determining a plurality of tube parameters by the processing device 24 based on the captured image of the at least portion of the tube 38, using an image processing technique as represented by the step 60. The plurality of tube parameters includes one or more of an outer diameter(s) of the tube 38, an inner diameter of the tube 38, and a material of the tube 38. As noted earlier, the material of the tube 38 is determined based on capacitance of the first and second sealing plates 20, 32. In one embodiment, the image processing technique includes determining of the plurality of tube parameters by preprocessing the captured image of the at least portion of the tube 38 to separate a tube region from a remaining region of the image. Thereafter, segmentation of the tube region is performed to separate regions of interest from a background region of the image by applying an feature detection algorithm to generate binary images. The inner and outer diameters of the tube 38 are determined based on pixel data of the binary images. Additionally, the material of the tube 38 is determined from the database 44 based on a capacitance of the first and second sealing plates 20, 32 determined based on an area of one of the first sealing plate 20 and the second sealing plate 32, a distance between the first sealing plate 20 at a start location of the sealing operation and second sealing plate 32, and an absolute permittivity of a dielectric material between the first and second sealing plates 20, 32.

Furthermore, the method 54 includes determining a plurality of sealing parameters from the database 44 by the processing device 24 based on the determined plurality of tube parameters as represented by the step 62. The plurality of sealing parameters includes a torque of the drive unit 22, a heating temperature of the heater 36, a movement distance of the first sealing plate 20 from a start location to a tube sealing location proximate to the second sealing plate 32, and at least one of a time period and a speed for moving the first sealing plate 20 from the start location to the tube sealing location proximate to the second sealing plate 32.

Further, the method 54 includes controlling the heater 36 and the drive unit 22 by the processing device 24 to perform the sealing of the tube 38 based on the determined plurality of sealing parameters as represented by the step 64. Specifically, during a loading operation of the tube 38, a loading handle 66 (shown in FIG. 2) is pulled upwards to move a red safety flag 68 (shown in FIG. 2) upwards. The loading handle 66 is released so that the red safety flag 68 is resting on top of the tube 38 disposed between the first sealing plate 20 and the second sealing plate 32.

The drive unit 22 moves the first sealing plate 20 from a start location towards the second sealing plate 32 to contact the tube 38. As a result, the tube 38 is held firmly between the first sealing plate 20 and the second sealing plate 32. The drive unit 22 further moves the first sealing plate 20 towards the second sealing plate 32 to compress the tube 38. Simultaneously, the heater 36 applies heat to the tube 38 which is compressed between the first sealing plate 20 and the second sealing plate 32 to a predefined temperature to melt sealing portions of the tube 38. Molten portions of the tube 38 is pressed between the first and second sealing plates 20, 32 and subsequently cooled (for example, air-cooled) under high pressure to fuse the sealing portions, resulting in a permanent, leak-proof, butt seal.

The steps of determining the plurality of tube parameters and the plurality of sealing parameters by the image processing technique are explained in greater detail with reference to subsequent figures.

Figure 4A:
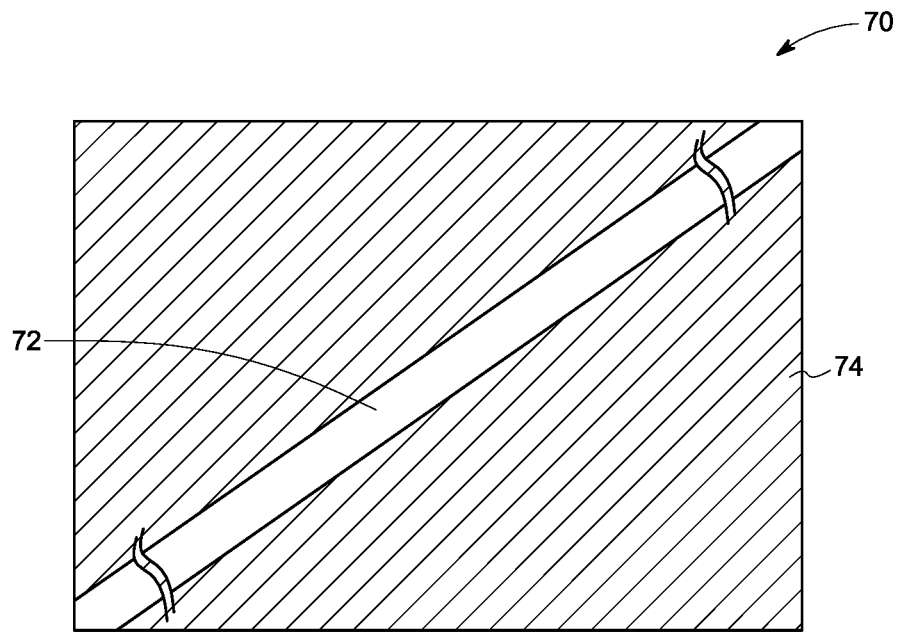
FIG. 4 a is a schematic representation of an image of at least a portion of the tube captured by the image capturing device in accordance with the embodiments of FIGS. 1, 2, and 3.
Figure 4B:
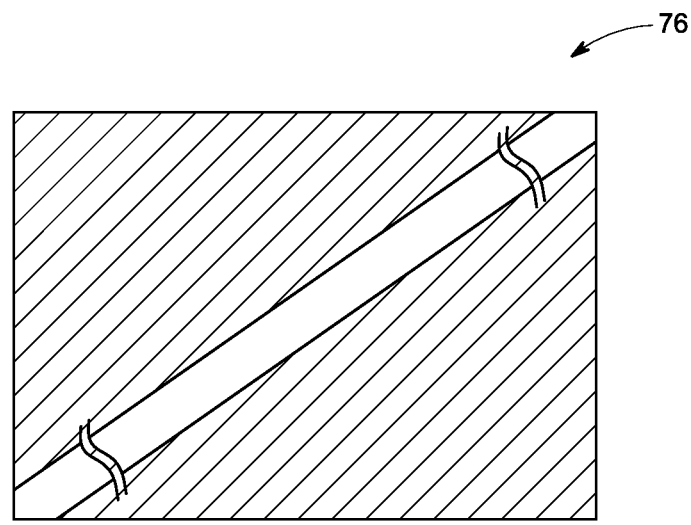

FIG. 4a is a schematic representation of an image 70 of the tube 38 captured by the image capturing device 26 in accordance with the embodiments of FIGS. 1, 2, and 3. The image 70 depicts a tube region 72 and a remaining region 74. The remaining region 74 is represented by a hatched region. FIG. 4b is a schematic representation of a preprocessed image 76 generated by preprocessing of the image 70 in which the tube region 72 is removed from the remaining region 74 of the image 70 by cropping using the processing device 24. The preprocessed image 76 may be softened to enable better segmentation.

Figure 5A:
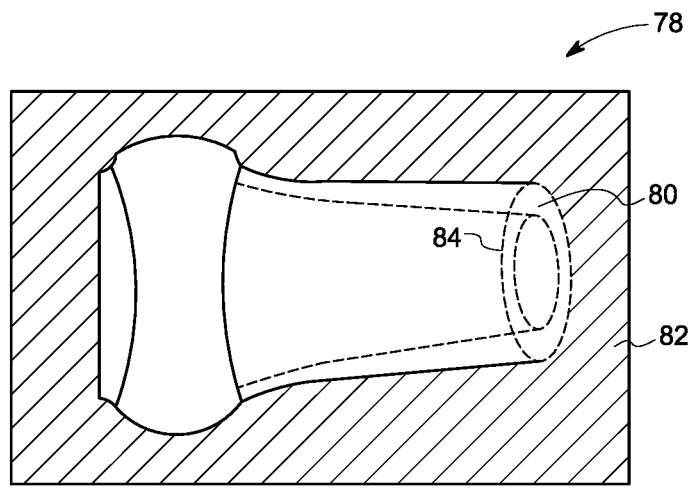
FIG. 5a is schematic representation showing a first binary image obtained by the segmentation of a preprocessed image in accordance with the embodiment of FIG. 4b.

FIG. 5a is schematic representation showing a first binary image 78 obtained by the segmentation of the preprocessed image 76 in accordance with the embodiment of FIG. 4b. In the illustrated embodiment, segmentation is a process of separating a first region of interest 80 from a first background region 82 (hatched region) with reference to the preprocessed image 76. Specifically, a feature detection algorithm 82 (shown in FIG. 2) is applied to the preprocessed image 76 to determine a first boundary 84 representative of an outer surface of the tube based on a first predefined threshold value, and thereby generate the first binary image 78. In the illustrated embodiment, the hatched region corresponds to the first background region 82 and unhatched region corresponds to the first region of interest 80. During segmentation, all the image pixels are partitioned based on the corresponding intensity values.

In one embodiment, a global thresholding technique is used to partition the image pixels. If an image intensity value of a pixel is less than the first predefined threshold value, the corresponding pixel is assigned a value equal to zero and classified as a background pixel. If an image intensity value of a pixel is greater than the first predefined threshold value, the corresponding pixel is assigned a value equal to one and classified as a pixel of the region of interest (foreground pixel). In another embodiment, a local thresholding technique is used for partitioning the image pixels. Specifically, the preprocessed image 76 may be split into a plurality of sub-images and a corresponding predefined threshold value may be chosen for each of the sub-images.

In yet another embodiment, an adaptive thresholding technique is used for partitioning the image pixels. Specifically, a corresponding predefined threshold value may be chosen for each of the image pixel.

Figure 5B:
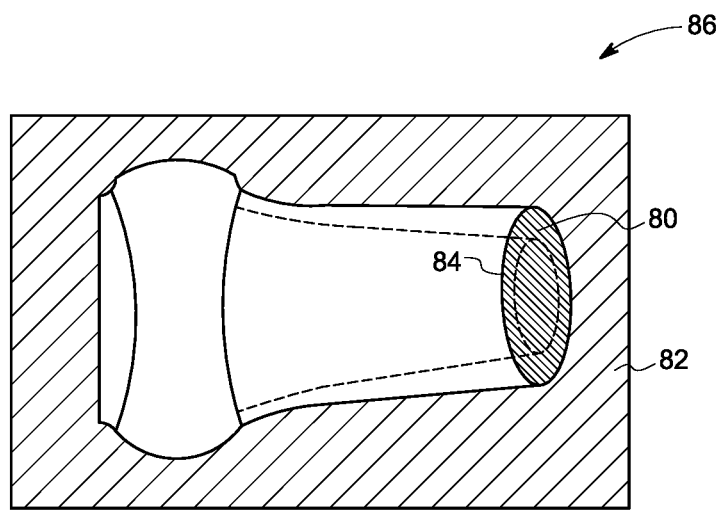

FIG. 5b is a schematic representation of a segmented image 86 in accordance with the embodiment of FIG. 5a. The first binary image 78 is subjected to closing, filling, and opening processes to generate the segmented image 86 in which the first region of interest 80 from the first background region 82.

Figure 6:
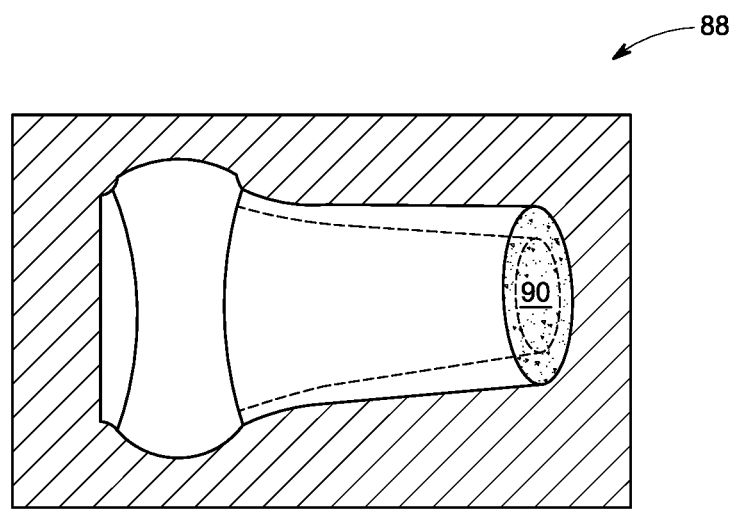
FIG. 6 is a schematic representation of a feature detection image obtained by closing, filling, and opening processes of a first binary image in accordance with the embodiment of FIG. 5b.

FIG. 6 is a schematic representation of a feature detection image 88 obtained by closing, filling, and opening processes of the first binary image 78 in accordance with the embodiment of FIG. 5b. The feature detection image 88 includes a pixel area 90 representative of the outer diameter of the tube 38. The outer diameter of the tube 38 is determined based on pixel data of the pixel area 90 of the generated first binary image 78. In one embodiment, the outer diameter is determined from the database based on the determined pixel data of the pixel area 90.

Figure 7A:
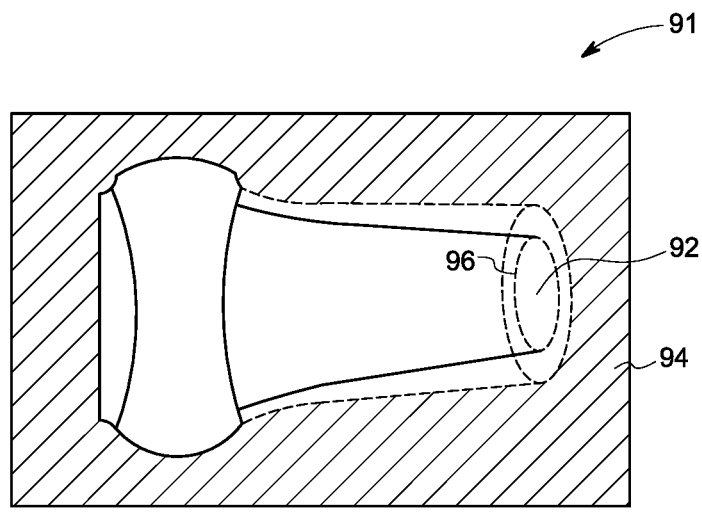
FIG. 7a is schematic representation showing a second binary image obtained by the segmentation of a preprocessed image in accordance with the embodiment of FIG. 4b.

FIG. 7a is schematic representation showing a second binary image 91 obtained by the segmentation of the preprocessed image 76 in accordance with the embodiment of FIG. 4b. Similar to the above embodiment, in the illustrated embodiment, segmentation is a process of separating a second region of interest 92 from a second background region 94 of the preprocessed image 74. Specifically, the feature detection algorithm 82 is applied to the preprocessed image 76 to determine a second boundary 96 representative of an inner surface of the tube based a second predefined threshold value, and thereby generate the second binary image 91. In the illustrated embodiment, the hatched region corresponds to the second background region 94 and the unhatched region corresponds to the second region of interest 92.

Figure 7B:
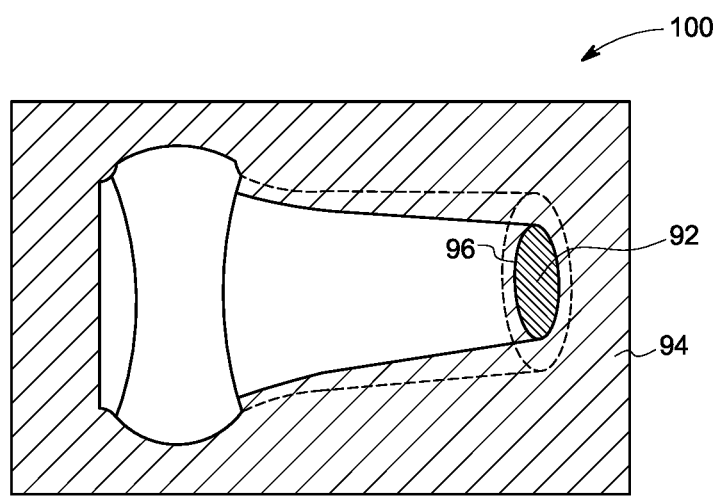

FIG. 7b is a schematic representation of a segmented image 100 in accordance with the embodiment of FIG. 7a. The second binary image 91 is subjected to closing, filling, and opening processes to generate the segmented image 100 in which the second region of interest 92 from the second background region 94.

Figure 8:
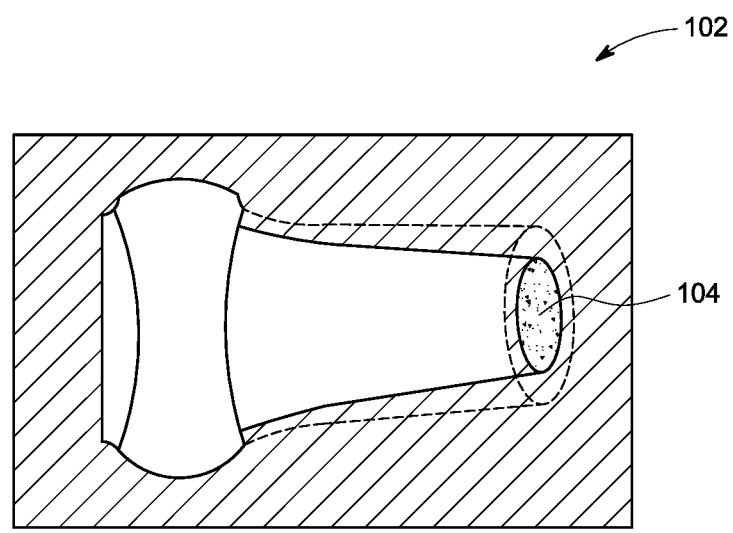
FIG. 8 is a schematic representation of a feature detection image obtained by closing, filling, and opening processes of a second binary image 91 in accordance with the embodiment of FIG. 7b.

FIG. 8 is a schematic representation of a feature detection image 102 obtained by closing, filling, and opening processes of the second binary image 91 in accordance with the embodiment of FIG. 7b. The feature detection image 102 includes a pixel area 104 representative of the inner diameter of the tube. The inner diameter of the tube is determined based on pixel data of the pixel area 104 of the generated second binary image 91. In one embodiment, the inner diameter is determined from the database based on the determined pixel data of the pixel area 104.

The material of the tube is determined from the database based on a determined capacitance of the first and second sealing plates. The capacitance 'c' is determined by the following relation:

$$c = \varepsilon a/d$$

where "A" is an area of either the first sealing plate and the second sealing plate, "d" is a distance between the first sealing plate at the start location and second the sealing plate, and "ε" is an absolute permittivity of di-electric material between the first and second sealing plates.

Figure 9:
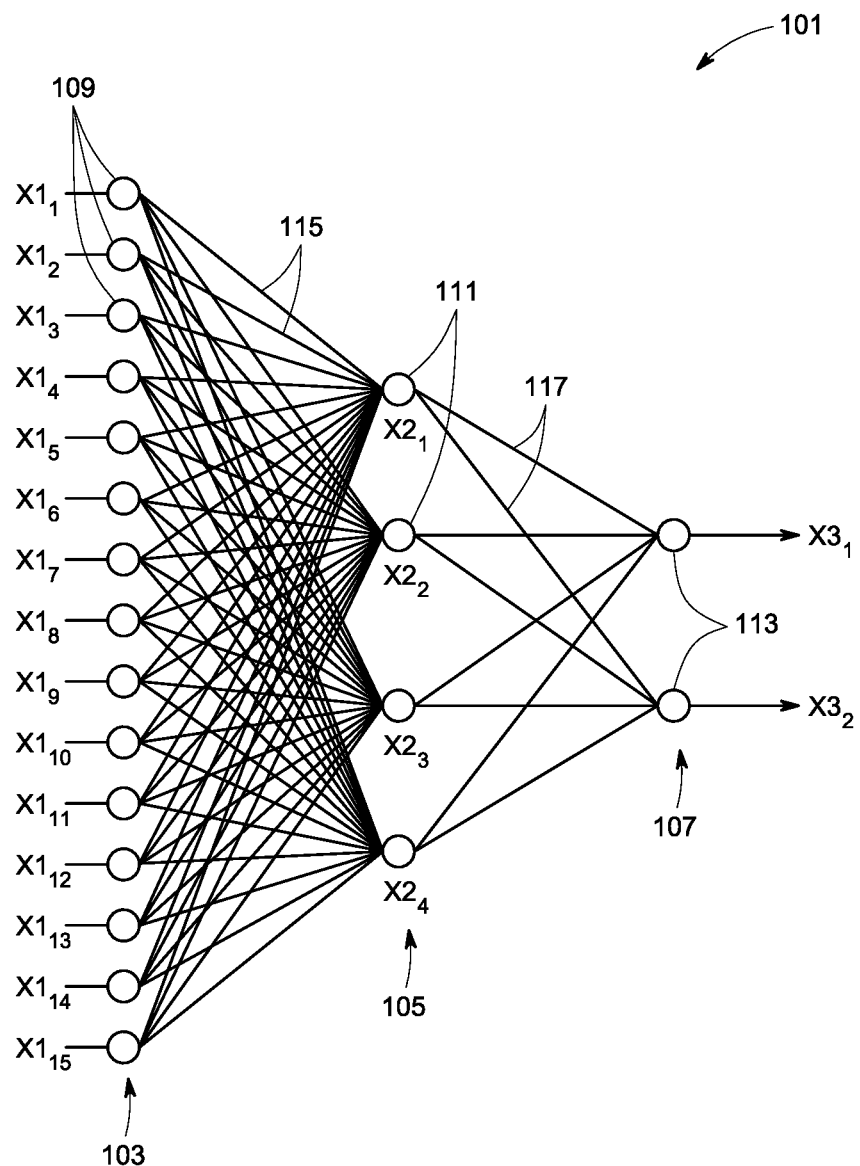
FIG. 9 is a schematic representation of an artificial neural network used for image processing for classifying a quality of a seal of a tube by a processing device based on a captured image of the seal of tube in accordance with another embodiment of the present specification.

FIG. 9 is a schematic representation of an artificial neural network 101 used for image processing for classifying a seal of the tube by the processing device based on the captured image of the seal of the tube in accordance with another embodiment of the present specification. In the illustrated embodiment, the artificial neural network 101 includes three layers, namely, an input layer 103, a hidden layer 105, and an output layer 107. The input layer 103 includes nodes 109, the hidden layer 105 includes nodes 111, and the output layer 107 includes nodes 113. The lines 115 between the nodes 103, 105 and lines 117 between the nodes 105, 107 indicate a flow of information. In the illustrated embodiment, the information flows only from the input layer 103 to the output layer 107 (i.e. from left-to-right). In certain other embodiments, an artificial neural network may have more intricate connections such as feedback paths. The nodes 109 of the input layer 103 are passive and hence do not modify input data. In comparison, the nodes 111 of the hidden layer 105, and the nodes 113 of the output layer 107 are active, and hence modify the input data. Input variables $X1_1$, $X1_2$ ... $X1_{15}$ include the input data to be evaluated. In the illustrated embodiment, the input data includes pixel values from the captured image of the at least portion of the tube. Each value from the input layer 103 is duplicated and sent to the nodes 111 of the hidden layer 105. The values fed to the nodes 111 of the hidden layer 105 are multiplied by corresponding weight values stored in a computer program. The weighted input values are then added to produce a single number. The number is processed by a nonlinear mathematical function referred to as a "sigmoid" that limits the output of each node 111. That is, an input to the sigmoid is a value between $-\infty$ and $+\infty$, while an output of the sigmoid is between zero and one. In the illustrated embodiment, outputs of the hidden layer 105 are represented by the variables: $X2_1$, $X2_2$, $X2_3$ and $X2_4$. Each of these output values is duplicated and applied to the output layer 107. The nodes 113 of the output layer 107 combine and modify data to produce two output values $X3_1$ and $X3_2$. It should be noted herein that each node in the artificial neural network 101 is essentially a mathematical function.

It should be noted herein that the artificial neural network 101 may have any number of layers and any number of nodes per layer. The number of such artificial neural networks 101 may also vary depending on the application. In one embodiment, the outputs of the nodes 113 of the output layer 107 may be indicative of the quality of the seal of the tube. In another embodiment, the outputs of the nodes 113 of the output layer 107 may be representative of the tube parameters of the tube. In another embodiment, the outputs of the nodes 113 of the output layer 107 may be used for performing segmentation of the image of the at least portion of the tube to generate binary images and then determine the inner and outer diameters of the tube 38 based on pixel data of the binary images.

Figure 10:
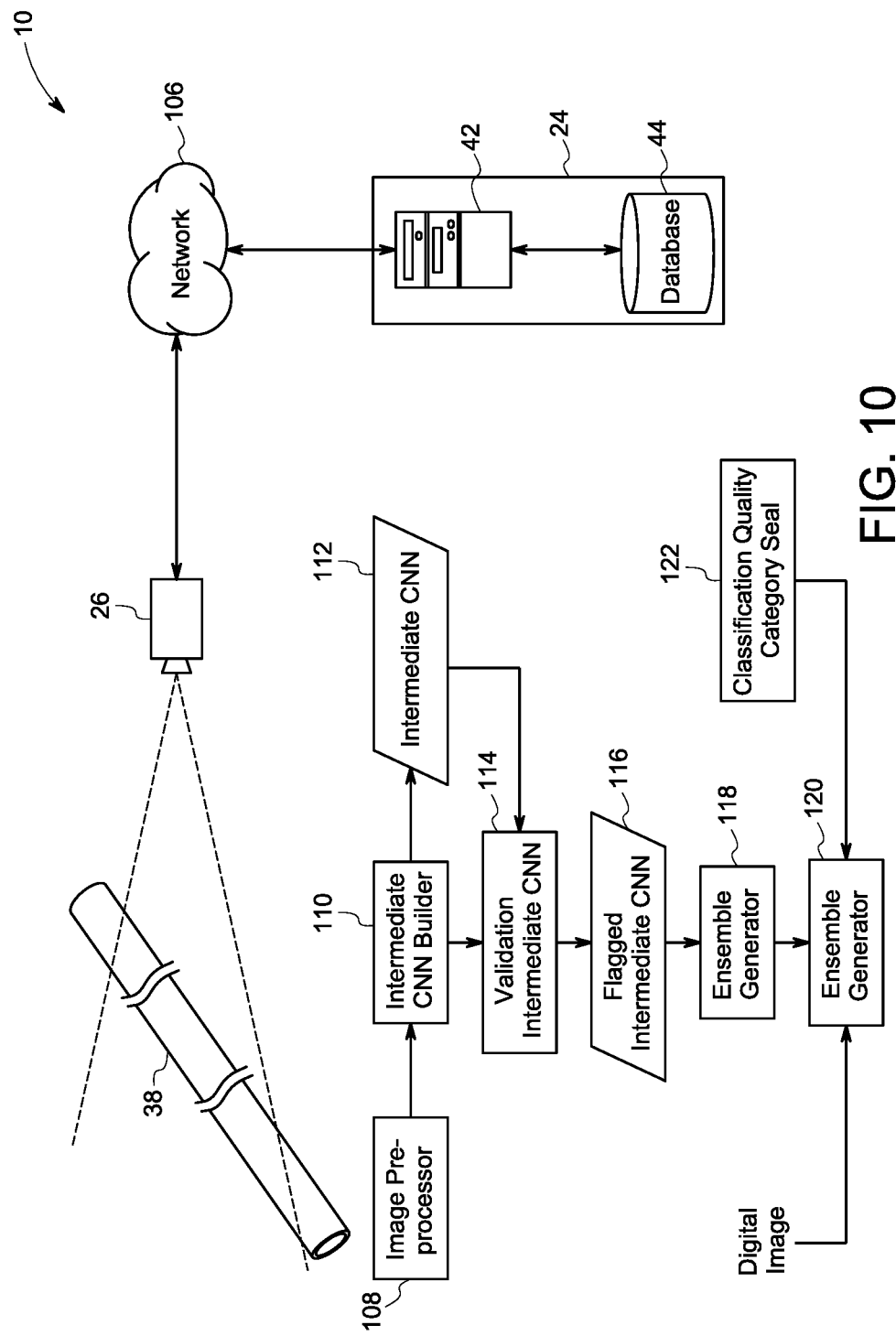
FIG. 10 is a schematic diagram of an image capturing device and a processing device coupled to the image capturing device in accordance with the embodiment of FIG. 1.

FIG. 10 is a schematic diagram of the image capturing device 26 and the processing device 24 coupled to the image capturing device 26 in accordance with the embodiment of FIG. 1. The image capturing device 26 communicates with the processor 42 via a communications network 106. According to an embodiment, the image capturing device 26 captures an image of the seal of the tube 38 and sends the image to the image processor 42 to automatically classify the quality of the seal using artificial neural networks.

The communications network 106 may include local area networks (LANs) and wide area networks (WANs), such as the internet. The communications network 106 may include signal bearing mediums that may be controlled by software, applications and/or logic. The communications network 106 may include a combination of network elements to support data communication services. For example, the communications network 106 may connect the image capturing device 26 to the processor 42 through the use of a physical connection such as copper cable, coaxial cable, and fiber cable, or through wireless technology such as radio, microwave, or satellite.

The processor 42, for example, may receive digital images from a training set at an image pre-processor 108. The image pre-processor 108 may crop and enhance particular content in the images from the training set to input into an intermediate convolutional neural network (CNN) builder 110. The intermediate CNN builder 110 may select various architectures and parameters to train an intermediate CNN 112. The intermediate CNN 112 may be then be evaluated on a validation set that is generated by a validation circuit 114. The validation circuit 114 may determine whether to flag the intermediate CNN 112 as satisfying a designated validation threshold. If the intermediate CNN 112 does not satisfy the validation threshold, the intermediate CNN 112 is not flagged and continues to be trained on the digital images from the training set by the intermediate CNN builder 110. However, if the intermediate CNN 112 satisfies the validation threshold, the intermediate CNN 112 is now a flagged intermediate CNN 116. As a result, the flagged intermediate CNN 116 is eligible to be selected as part of an ensemble of optimized CNNs that is generated by an ensemble generator 118. The ensemble generator 118, for example, may create an ensemble 120 of optimized CNNs.

The predictions aggregated from the ensemble 120 may be used to accurately classify the seal from the inputted digital image.

According to an example, the processor 42 may receive an image of the seal of the tube 38 and automatically classify the seal of the tube 38 using CNNs to recognize and classify the damage in the image of the seal of the tube 38. According to an example, the processor 42 may classify the quality of the seal of the tube into various predetermined classification quality category seal 122 such as, but not limited to, good seal, partially good seal, bad seal.

As mentioned earlier, the processor 42 is coupled to the database 44. The database 44 may store data which is relied upon to classify the quality of the seal of the tube 38 by the image processor 42. For example, the database 44 may store training sets and validation sets that include digital images of seals of various classification quality categories. Such digital images are relied upon by the image processor 42 to build a model that accurately assesses and classifies the quality of the seal of the tube 38. The processor 42 also updates the mathematical functions of the artificial neural networks neural based on the classified quality of the seal of the tube 38.

Figure 11:
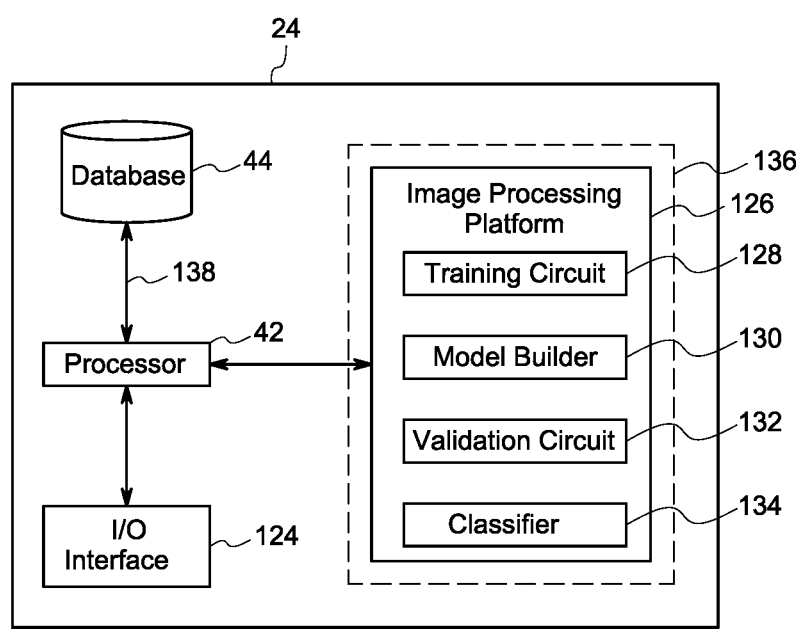
FIG. 11 is a block diagram of a processing device for image processing using convolutional neural networks (CNNs) according to an embodiment of the present specification.

FIG. 11 is a block diagram of the processing device 24 for image processing using convolutional neural networks (CNNs) according to an embodiment of the present specification. It should be understood that the processing device 24 may include additional components and that one or more of the components described herein may be removed and/or modified without departing from a scope of the processing device 24.

The processing device 24 is depicted as including the processor 42, the database 44, an input/output (I/O) interface 124, and an image processing platform 126. The components of the processing device 24 may be on a single computer or server as an example and in other examples the components may exist on multiple computers or servers. The processor 42 may store data in the database 44 and/or may manage the storage of data stored in a separate computing device, for instance, through the I/O interface 124. The image processing platform 126 is depicted as including a training circuit 128, a model builder 130, a validation circuit 132, and a classifier 134. The training circuit 128, for example, may create a training set from images of seals of various classification quality categories. Such a training set may be used by the model builder 130 to build a CNN model. The model builder 130, for example, may build a CNN model on the training set according to a selected candidate architecture and candidate parameters for the CNN model. According to an example, the plurality of candidate architectures may include different combinations of a number of convolution layers and subsampling layers and a classifier type. The classifier type may include a multilayer perceptron (MLP), a support vector machine (SVM), and the like.

According to an example, the candidate parameters may include a learning rate, a batch size, a maximum number of training epochs, a convolutional filter size, a number of feature maps at every layer of the CNN, a sub-sampling pool size, an input image size, a number of hidden layers, a number of units in each hidden layer, a selected classifier algorithm, and a number of output classes. Examples of learning parameters include the learning rate, the batch size, and the maximum number of training epochs. Examples of convolution and sub-sampling parameters include the convolutional filter size, the number of feature maps at each layer of the CNN, and the sub-sampling pool size. Examples of classifier parameters include the image input size, the number of hidden layers, the number of units in each layer, the selected classifier algorithm, and the number of output classes.

The validation circuit 132, for example, may evaluate performance of the CNN model built by the model builder 130 on a validation set and determine whether the CNN model satisfies a validation threshold. The classifier 134, for example, may classify a quality of a seal of a tube in each image in the validation set. The classifier 134 may also aggregate predictions from an ensemble of optimized CNN models to more accurately assess the images of seals of various classification quality categories. In an example, the image processing platform 126 includes machine readable instructions stored on a non-transitory computer readable medium 136 and executed by the processor 42. The processor 42 may be coupled to the database 44 and the I/O interface 124 by a bus 138 that transfers data between various components of the processing device 24.

In one embodiment, the processing device 24 may be used to predict a failure of the sealing system based on the classified quality of the seal of the tube. For example, during consecutive cycles of sealing operations, if the quality of the seals of the tubes are classified consistently as a "bad category", the processing device 24 may predict that the failure of the sealing system is imminent. In another example, during consecutive cycles of sealing operations, if the quality of the seals of the tubes are classified frequently as a "bad category", the processing device 24 may predict that the failure of the sealing system.

Figure 12A:
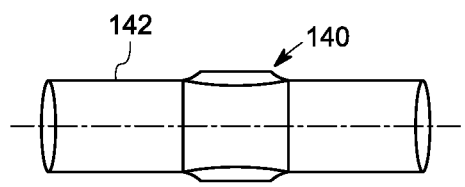
FIG. 12a is a schematic diagram of a classified good quality seal of a tube in accordance with one embodiment of the present specification.

FIG. 12*a* is a schematic diagram of a classified good quality seal 140 of a tube 142 in accordance with one embodiment of the present specification. The seal 140 has smooth and uniform edges and uniform width.

Figure 12B:
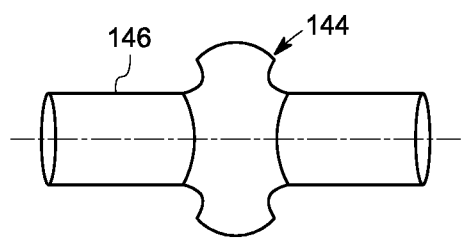
FIG. 12b is a schematic diagram of a classified bad quality seal of a tube in accordance with one embodiment of the present specification.

FIG. 12*b* is a schematic diagram of a classified bad quality seal 144 of a tube146 in accordance with one embodiment of the present specification. The seal 144 has a deformed edge.

Figure 12C:
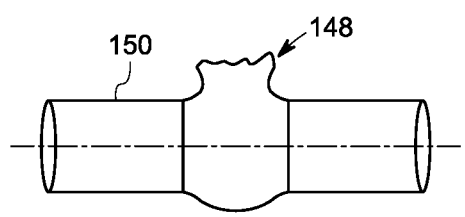
FIG. 12c is a schematic diagram of another classified bad quality seal of a tube accordance with one embodiment of the present specification.

FIG. 12*c* is a schematic diagram of another classified bad quality seal 148 of a tube 150 accordance with one embodiment of the present specification. The seal 148 has a split and ragged edge.

Figure 12D:
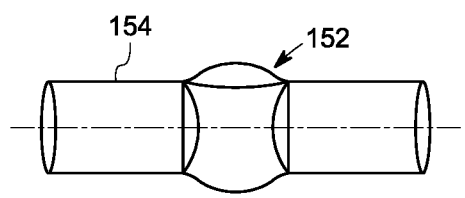
FIG. 12d is a schematic diagram of another classified bad quality seal of a tube in accordance with one embodiment of the present specification.

FIG. 12*d* is a schematic diagram of another classified bad quality seal 152 of a tube 154 in accordance with one embodiment of the present specification. The seal 152 has bubbles formed in a center portion.

It should be noted herein that FIGS. 12*a*-12*d* are embodiments and should be construed as limiting the scope of the invention. Seal features for classifying a quality of a seal of a tube may vary depending on the application. Similarly, criterion for correlating a quality of a seal of a tube to a failure of the sealing system may vary depending on the application.

In accordance with the embodiments discussed herein, the exemplary automated sealing system and method eliminates the need for manual interventions for inputting operating parameters for sealing multiple variants of sealing tubes having different sizes and materials. As a result, errors and production batch losses are minimized and sealing time is reduced. The exemplary sealing system and method also enable to automatically checking a quality of a seal of a tube and predict a failure of the sealing system based on the determined quality of the seal of the tube.

There is a need for an enhanced sealing system capable of automatically handling different variants of sealing tubes and inspection of quality of seals of the sealing tubes. There is also a need to predict a failure of a sealing system based on a determined seal quality.

While only certain features of the specification have been illustrated and described herein, many modifications and changes will occur to those skilled in the art. It is, therefore, to be understood that the appended claims are intended to cover all such modifications and changes as fall within the true spirit of the specification.

The invention claimed is:

1. An automated method for sealing a tube by a sealing system, the automated method comprising:
    directing illuminating rays from a source to the tube disposed between relatively movable first and second sealing plates, wherein at least one of the first and second sealing plates is coupled to a drive unit for causing said relative movement;
    capturing an image of at least a so illuminated portion of the tube at an image capturing device and transferring the captured image of the at least portion of the tube from the image capturing device to a processing device;
    operating the processing device to determine a plurality of tube parameters the based on the captured image, using an image processing technique;
    operating the processing device to determine a plurality of sealing parameters selected from a database and based on the determined plurality of tube parameters; and
    operating the processing device to control the drive unit and a heater, influenced at least in part by the determined plurality of sealing parameters, to respectively compress the tube and perform heat sealing of the tube, wherein the compressing of the tube and the performing of the heat sealing of the tube occurs after the determining of the plurality of sealing parameters.

2. The automated method as claimed in claim 1, wherein the plurality of tube parameters comprises one or more of: an outer diameter of the tube, an inner diameter of the tube, and a material of the tube.

3. The automated method as claimed in claim 2, wherein determining the plurality of the tube parameters by the image processing technique comprises:
    preprocessing the captured image of the at least portion of the tube to separate a tube region from a remaining region; and performing a segmentation of the tube region to separate regions of interest from a background region.

4. The automated method as claimed in claim 3, wherein performing the segmentation of the tube region comprises:
    applying a feature detection algorithm to determine a first boundary representative of an outer surface of the tube based on a first predefined threshold value; and
    generating a first binary image based on the determined first boundary representative of the outer surface of the tube.

5. The automated method as claimed in claim 4, wherein determining the plurality of the tube parameters comprises determining the outer diameter of the tube based on pixel data of the generated first binary image.

6. The automated method as claimed in claim 4, wherein performing the segmentation of the tube region comprises:
    applying the feature detection algorithm to determine a second boundary representative of an inner surface of the tube based on a second predefined threshold value; and
    generate a second binary image based on the determined second boundary representative of the inner surface of the tube.

7. The automated method as claimed in claim 6, wherein determining the plurality of the tube parameters comprises determining the inner diameter of the tube based on pixel data of the generated second binary image.

8. The automated method as claimed in claim 7, wherein determining the plurality of the tube parameters comprises determining the material of the tube from the database based on a capacitance determined based on an area of one of the first sealing plate and the second sealing plate, a distance between the first sealing plate at a start location and the second sealing plate, and an absolute permittivity of a dielectric material between the first and second sealing plates.

9. The automated method as claimed in claim 1, wherein the image processing technique comprises using a mathematical function of an artificial neural network.

10. The automated method as claimed in claim 1, wherein the plurality of sealing parameters comprises a torque of the drive unit, a heating temperature of the heater, a movement distance of the first sealing plate from a start location to a tube sealing location proximate to the second sealing plate, and at least one of a time period and a speed for moving the first sealing plate from the start location to the tube sealing location proximate to the second sealing plate.

11. The automated method as claimed in claim 1, comprising capturing an image of a seal of the tube by the image capturing device and transferring the image of the seal of the tube from the image capturing device to the processing device.

12. The automated method as claimed in claim 11, comprising processing the captured image of the seal of the tube to classify a quality of the seal of the tube by the processing device, using a mathematical function generated by artificial neural networks.

13. The automated method as claimed in claim 12, wherein processing the captured image of the seal of the tube comprises:
    selecting a candidate architecture and candidate parameters for each artificial neural network; and
    determining an ensemble of artificial neural networks which satisfies a validation threshold, from the plurality of artificial neural networks; and
    aggregating predictions from the ensemble of the artificial neural networks to classify the quality of the seal of the tube as one of a plurality of quality categories.

14. The automated method as claimed in claim 12, comprising updating the mathematical function based on the classified quality of the seal of the tube.

15. The automated method as claimed in claim 12, comprising predicting a failure of the sealing system based on the classified quality of the seal of the tube.

16. A sealing system for sealing a tube, the sealing system comprising:
    a first sealing plate;
    a drive unit; a second sealing plate disposed spaced apart from the first sealing plate, wherein at least one of the first and second sealing plates is coupled to the drive unit for causing relative movement of the first and second sealing plates;
    a heater capable of heat sealing the tube disposable in a space between the first and second plates;
    an illuminating source for directing illuminating rays towards the space;
    an image capturing device for capturing an image of at least a portion of the tube in the space; and a processing device coupled to the image capturing device, the heater, and the drive unit, wherein the processing device is configured to:

receive the captured image of the at least portion of the tube from the image capturing device; determine a plurality of tube parameters based on the captured image of the at least portion of the tube, using an image processing technique; determine a plurality of sealing parameters from a database based on the determined plurality of tube parameters; and control the drive unit and the heater by the processing device influenced at least in part by the determined plurality of sealing parameters, to respectively compress the tube and perform heat sealing of the tube, wherein the compressing of the tube and the performing of the heat sealing of the tube occurs after the determining of the plurality of sealing parameters.

17. The sealing system as claimed in claim 16, wherein the plurality of tube parameters comprises one or more of an outer diameter of the tube, an inner diameter of the tube, and a material of the tube.

18. The sealing system as claimed in claim 16, wherein the plurality of sealing parameters comprises a torque of the drive unit, a heating temperature of the heater, a movement distance of the first sealing plate from a start location to a tube sealing location proximate to the second sealing plate, and at least one of a time period and speed for moving the first sealing plate from the start location to the tube sealing location proximate to the second sealing plate.

19. The sealing system as claimed in claim 18, comprising:

a torque sensor coupled to the drive unit and the processing device, wherein the torque sensor is configured to detect the torque of the drive unit and transmit an output representative of the detected torque to the processing device; a temperature sensor coupled to the heater and the processing device, wherein the temperature sensor is configured to detect the heating temperature of the heater; and a speed sensor coupled to the first sealing plate and the processing device, wherein the speed sensor is configured to measure a speed of movement of the first sealing plate from the start location to the tube sealing location proximate to the second sealing plate.

20. The sealing system as claimed in claim 18, comprising:

a distance sensor coupled to the first sealing plate and the processing device, wherein the distance sensor is configured to measure the movement distance of the first sealing plate from the start location to the tube sealing location proximate to the second sealing plate; and a timer coupled to the first sealing plate and the processing device, wherein the timer is configured to measure the time period for moving the first sealing plate from the start location to the tube sealing location proximate to the second sealing plate.

21. The sealing system as claimed in claim 16, wherein the image capturing device is further used to capture an image of a seal of the tube (38), and wherein the processing device is further configured to receive the image of the seal of the tube from the image capturing device.

22. The sealing system as claimed in claim 21, wherein the processing device is further configured to process the captured image of the seal of the tube to classify the seal of the tube, using artificial neural networks.

* * * * *